Sept. 26, 1961  M. SHEER  3,002,082
WELDING MACHINE
Filed Oct. 9, 1959  2 Sheets-Sheet 2

United States Patent Office 3,002,082
Patented Sept. 26, 1961

3,002,082
WELDING MACHINE
Marshall Sheer, Brookline, Mass., assignor to Seton Corporation, Providence, R.I., a corporation of Delaware
Filed Oct. 9, 1959, Ser. No. 845,437
6 Claims. (Cl. 219—97)

This invention relates to flash-butt welding machines and more particularly to such welding machines for welding thin sheet metal or thin metal sections, such machines incorporating means for removing automatically, as a function of the machine cycle, the flash or upset metal produced by the welding operation, and without buckling or otherwise distorting the work.

The force with which the adjacent surfaces of the workpieces are driven together by a flash-butt welding machine is substantial in magnitude and it is necessary, particularly with thin workpieces, adequately to support them in the area adjacent the surfaces to be welded to insure proper alignment of the surfaces as they are driven together and to prevent buckling or other distortion. Thus it is desirable that the workpieces be supported as near as possible to the edges to be welded. The location of the support, however, is dependent in part on the amount of metal which is displaced outwardly from the area of the weld when the workpieces are driven together, which metal, generally called "flash" or "upset" metal, forms a raised surface in the vicinity of the weld and must subsequently be removed.

As described in U.S. Patent No. 2,875,319, in certain macines of the flash-butt type, the upset metal is removed by providing a cutting or shearing member on the welding machine itself, preferably as a portion of the platen structure, which operates to remove the upset metal from the weld area as a part of the machine cycle. However, such a shearing member causes problems because of the lack of support of the thin metal workpieces during shearing produces high compressive forces and hence buckling and other distortion.

Accordingly, it is an object of the present invention to provide, in a welding machine, means, useful in the welding of thin metal workpieces, for providing a novel upset removing cycle as a successive operation to the welding cycle. This has been accomplished by providing a novel welding machine and control system therefor including a separate upset removing or shearing member in addition to the usual clamping mechanisms, so that three workpiece supporting members are provided, as well as means for moving them relatively to one another in such a way as to achieve welding and shearing without buckling. The control system operates the machine so that, upon completion of the welding portion of the machine cycle as by contacting a stop and cutting off the welding current, the mechanism having the shearing member associated with it will be opened automatically a predetermined but slight distance while maintaining clamping pressure on the other clamping mechanisms to maintain positioning support for the welded workpieces. The stop is then automatically removed so that the resulting further advance of the clamping mechanisms relatively to the shearing mechanism therebetween will operate to shear or otherwise remove the "flash" or "upset" metal from the weld.

It is a feature of the invention that compressive forces on a workpiece during shearing are much reduced, so that buckling is avoided, this being accomplished by placing at least a portion of the workpiece in tension as by pulling it through the shearing member as well as pushing it to more nearly balance the forces therein.

It is another feature of the present invention that the automatic removal of the upset is carried out while the welded workpieces are still supported in the welding machine clamping mechanism and while their temperature is in an optimum range for such operation to produce an accurately dimensioned finished weld. Thus, welding machines according to the present invention are particularly well adapted to mass production methods and to automatic welding equipments.

Further objects and features of the invention will become apparent from the following description of a preferred embodiment and modification thereof, together with the accompanying drawings in which.

Figure 1:
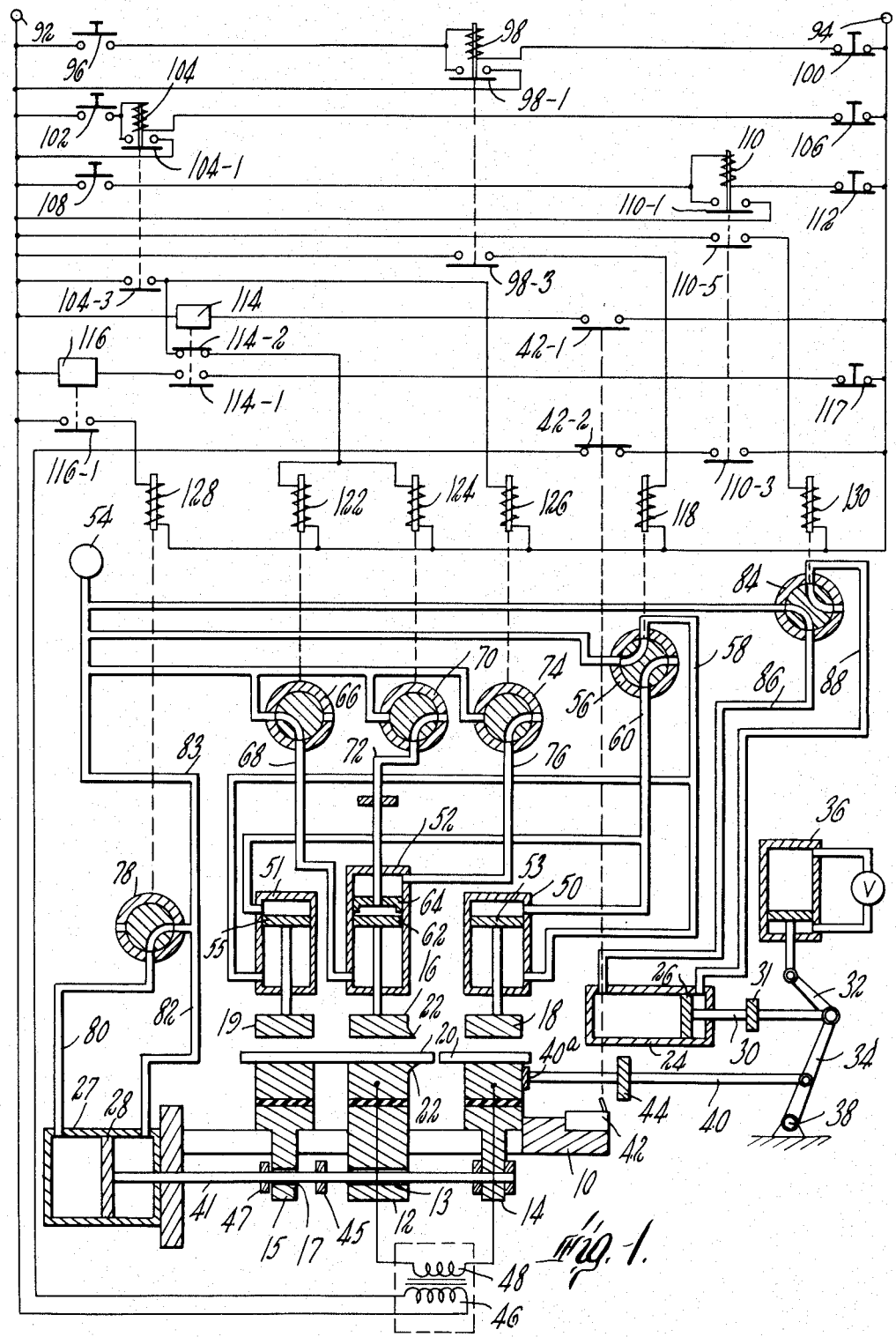
FIG. 1 is a schematic diagram of the welding machine of the invention and its control system including the hydraulic and electrical circuitry of the preferred embodiment of the invention.

With reference to FIG. 1, the welding machine has a base 10 upon which are mounted an insulated fixed platen 12 and a pair of insulated movable platens 14 and 15. Each of the platens 12, 14 and 15 has a clamping structure 16, 18 and 19 respectively, consisting of an upper jaw and a lower jaw, for clamping the piece of work 20 to be welded. The jaws of clamping structure 16 include shearing portions 22 which are adapted to remove upset metal from the area of the weld.

For operation thereof the movable clamps 18 and 19 have single piston cylinders 50 and 51 associated therewith and the fixed clamp 16 has a two piston cylinder 52, best shown in FIG. 7 and hereinafter described, associated with it.

The movable platen 14 is actuated by hydraulic motor mechanisms which are adapted to provide, (1) a controlled forward movement during the flash off, (2) a more rapid forward movement and a relatively quick-pushup to bring the workpieces 20 together to produce the weld and simultaneously produce an upset of the adjacent ends of the pieces 20 and (3) a subsequent advance of said platen 14 simultaneously with platen 15 relatively to the fixed platen 12, so that said fixed platen moves relatively to the welded workpiece across the weld area. Thus the clamping structure 16 with its shearing portions 22 removes the upset as the weld area advances. The mechanism for moving platen 14 includes a hydraulic cylinder 24 with piston 26 therein. The piston rod 30, having a stop device 31 thereon, is attached to the piston 26, and is connected to a toggle mechanism, consisting of two links 32, 34, at the pivot connection between links 32 and 34. The second end of link 32 is connected to a snubbing mechanism 36 and the second end of link 34 is connected to a fixed pivot point 38. The main operating rod 40 is attached to the link 34 at an intermediate point thereon and extends towards the movable platen 14 with its end portion 40a just in contact therewith at the machine position of FIG. 1. A limit switch 42, the electrical control for the removable stop in the platen advance, is mounted on the base 10 and is operated by a trip device 44 mounted on the rod 40. The movable platen 14 also has an actuating rod 41 connected to a piston 28 within cylinder 27, said rod passing through a bore 13 in fixed platen 12 and a bore 17 in the other movable platen 15. A stop device 45 is mounted on rod 41 between fixed platen 12 and movable platen 15 such that upon sufficient advance of movable platen 14, stop 45 will contact movable platen 15 and advance it thereafter with movable platen 14. Another stop device 47 is also mounted on rod 41 on the other side of platen 15 to return said platen after completion of a weld cycle. Suitable welding current is supplied to the welding machine by a welding transformer 46 having one terminal of its secondary winding 48 connected to the fixed platen 12 and the other terminal connected to the movable platen 14.

The welding machine is illustrated in the retracted, unclamped position in FIG. 1, and the hydraulic circuitry will be initially described in such condition. The platen clamping cylinders 50 and 51 are divided by pistons 53 and 55 into two chambers. The lower chamber of each portion is connected to a source of hydraulic pressure 54 through a solenoid operated four way valve 56 and line 58 and the upper chamber is connected to the atmosphere through the solenoid valve 56 and line 60. The platen clamping cylinder 52 is divided by pistons 62 and 64 into three chambers. The lower chamber is connected to source 54 through a solenoid operated three way valve 66 and line 68, the middle chamber connected to the atmosphere through three way valve 70 and line 72, and the upper chamber is connected to the atmosphere through a solenoid operated three way valve 74 and line 76. The platen operating cylinder 24 is divided into two chambers by piston 26 connected to the source 54 or the atmosphere through a solenoid operated valve 84 and lines 86 and 88. Sheer operating cylinder 27 has its right chamber connected directly through lines 82 and 83 to pressure source 54 and its left chamber connected through lines 80 and valve 78 either to said source or to exhaust.

The solenoids associated with these valves are connected in parallel across lines 92 and 94. Each solenoid is in series with one or more pairs of contacts of timing and/or control relays. All the electrical control circuitry for the welding machine is connected to a suitable source by lines 92 and 94.

In this description the contacts associated with a relay coil are designated by the coil's reference number and an additional number to designate the set of contacts. An odd number is used for normally open contacts and an even number for normally closed contacts. For example, contacts 110—3 are a set of normally open contacts associated with coil 110.

The platen clamping control circuit for cylinders 50 and 51 includes a normally open push button 96, a control relay coil 98 and a normally closed push button 100, in series across lines 92 and 94. Contacts 98—1 are in parallel with push button 96. The platen clamping control circuit for cylinder 52 includes a normally open push button 102, a control relay coil 104 and a normally closed push button 106, in series across lines 92 and 94. Contacts 104—1 are in parallel with push button 102. The platen advancing control circuit includes a normally open push button 108, a control relay 110 and a normally closed push button 112, in series across lines 92 and 94. Contacts 110—1 are in parallel with push button 108. The welding current control circuit includes the primary winding of transformer 46, contacts 110—3 and contacts 42—2 of the limit switch 42, in series across lines 92, 94. A first timing relay 114 is connected in series with contacts 42—1 of the limit switch and a second timing relay 116 is connected in series with contacts 114—1 and a normally closed push button 117.

The solenoids associated with the hydraulic valves are all connected across lines 92, 94. Solenoid 118, operating valve 56, is connected in series with contacts 98—3. Solenoids 122 and 124, operating valves 66 and 70, are connected in series with contacts 104—3 and 114—2. Solenoid 126, operating valve 74, is connected in series with contacts 104—3. Solenoid 128, operating valve 78, is connected in series with contacts 116—1. Solenoid 130 operating valve 84, is connected in series with contacts 110—5.

Figure 2:
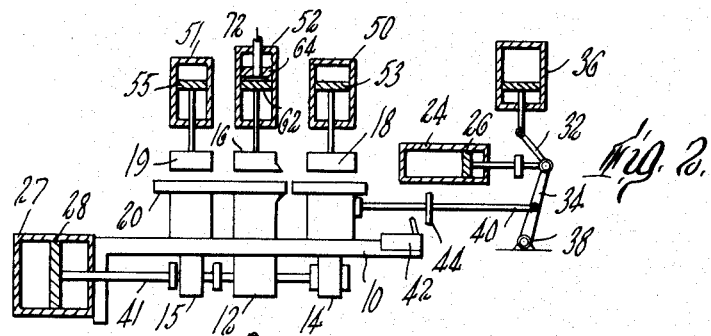
FIG. 2 is a diagrammatic view of the welding machine, the clamping pistons and actuating mechanism associated therewith, with unclamped workpieces placed in the welding machine prior to welding.
Figure 3:
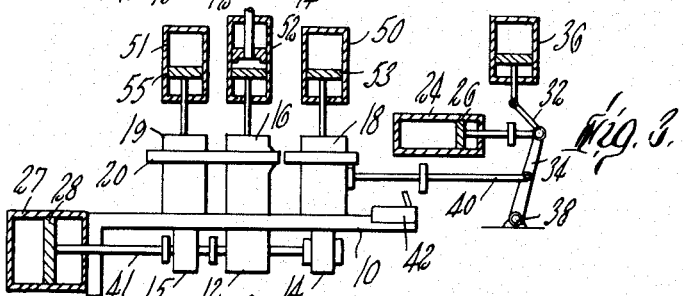
FIG. 3 is a view of the apparatus of FIG. 2 with the workpieces clamped.
Figure 4:
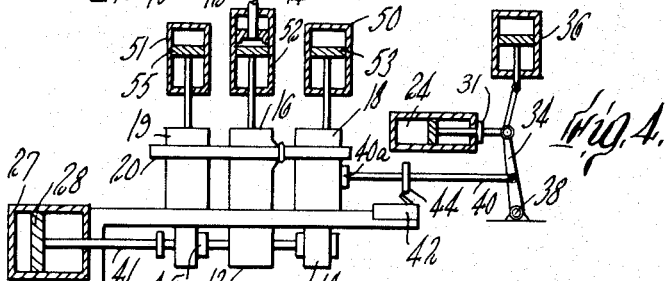
FIG. 4 is a view of the apparatus of FIG. 2 with the workpieces welded together.
Figure 5:
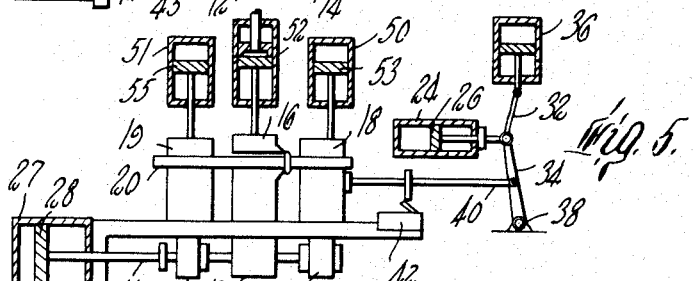
FIG. 5 is a view of the apparatus of FIG. 2 with the clamp associated with the shearing mechanism in unlocked position, preparatory to the shear-off operation.

The welding and shear off cycle of the apparatus in this embodiment is diagrammatically illustrated in FIGS. 2–6 and operates in the following manner. The workpieces 20 are placed in the platens 12, 14, and 15 with their adjacent edges between platens 12 and 14, separated a predetermined distance as shown in FIGS. 1 and 2. The platen clamping structures 18 and 19 are actuated by the depression of push button 96 which energizes relay coil 98 and closes contacts 98—1 (to complete the holding circuit across push button 96) and contact 98—3 energizing solenoid coil 118. The energization of coil 118 operates valve 56 to connect line 60 to hydraulic source 54 and line 58 to the atmosphere. The pistons 53 and 55 are driven downward, actuating the movable platen clamping structures 18 and 19 to secure the workpieces. The fixed platen clamping structure 16 is actuated by push button 102 which energizes relay 104, closing contacts 104—1 (to complete the holding circuit across push button 102) and contacts 104—3 energizing solenoid coils 122, 124, and 126. The energization of coil 122 operates valve 66 to connect line 68 to the atmosphere; the energization of coil 124 operates valve 70 to connect line 72 to the hydraulic source 54; and the energization of coils 126 operates valve 74 to connect line 76 to hydraulic source 54. The pistons 62, 64 are driven downward, actuating the clamping structure 16, there being pressure in the intermediate chamber (between pistons 62 and 64) such that the pistons 62, 64 are spaced apart. (The details of this cylinder may be better understood with reference to FIG. 7 and is described hereinafter.) The clamping structures in this position are shown in FIG. 3.

The platen movement cycle is initiated by the depression of push button 108 which energizes coil 110, closing contacts 110—1 (to complete the holding circuit across push button 108) contacts 110—3 and contacts 110—5. The primary circuit of the welding current transformer 46 is completed by the closing of contacts 110—3 and the welding voltage is impressed on the output terminals of the transformer secondary 48. The advance of the movable platen 14 toward fixed platen 12 is initiated by the energization of solenoid coil 130 through the closing of contacts 110—5. The energization of coil 130 operates valve 84 to connect line 86 to the atmosphere and line 88 to the source 54. Piston 26 is driven to the left actuating the toggle mechanism and advancing the movable platen 14 through the links 32, 34 and rod 40 (cylinder and piston 27 being of substantially equal area although with the left chamber of slightly greater area due to the reduction caused by its piston rod, do not prevent this movement. Normally, this slight difference in area causes piston 28 to be moved to the right). The movable platen 14 advances at a relatively slow rate as controlled by the snubbing mechanism 36 during the flash off. During this period, an arc is initiated across the adjacent surfaces of the workpieces 20 to heat these surfaces in preparation for welding. After the toggle linkage passes dead center, the workpieces 20 are driven together at a more rapid rate to form a weld as the snubbing mechanism 36 thereafter no longer impedes the movement of the toggle. The forward travel or the amount of upset is controlled by the stop 31 coming in contact with the end of cylinder 24.

Stop 45 comes in contact with platen 15 a few thousandths of an inch before stop 31 arrests the platen travel at the end of upset, thus prestressing the work pieces 20 between platens 15 and 12 holding it in tension. The position of the clamps and driving mechanism at this time is as diagrammed in FIG. 4. This unique prestressing of the welded workpiece is especially vital with thin metal workpieces in preventing buckling and tearing, since it results in both pulling and pushing the workpiece during shearing.

At some point during the flash off and upset welding cycle the removable stop for the platen advance functions as the limit switch 42 is operated by the stop 44 to open contacts 42—2, deenergizing the primary of the transformer 46 to turn off the welding current, and to close contacts 42—1 to energize the time delay relay 114. After a short time delay of approximately 1–5 seconds to allow the temperature of the weld to be reduced, the relay 114 operates to close contacts 114—1 and to open contacts 114—2. The closing of contacts 114—1 energizes time delay relay 116 and the opening of contacts 114—2 deenergizes solenoid coil 122 and 124. The deenergization of coil 122 operates valve 66 to connect line 68 to source 54 and the deenergization of coil 124 operates valve 70 to connect line 72 to the atmosphere. Piston 62 is driven toward piston 64 which forms a removable stop at a point as diagrammed in FIG. 5. This operation opens the clamping structure 16 a slight amount (approximately 0.010 inch) to permit movement of fixed platen 12 relative to the welded workpieces while maintaining positioning support for the welded pieces. After an appropriate time delay, as determined by relay 116 to insure the opening of the clamping structure 16, the relay 116 operates to close contacts 116—1 energizing solenoid coil 128.

Figure 6:
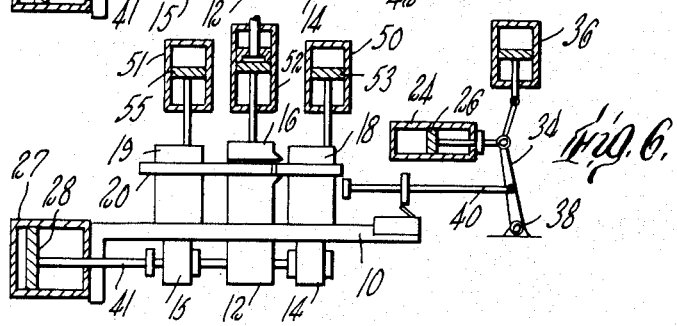
FIG. 6 is a view of the apparatus of FIG. 2 after the shear-off operation.

The energization of coil 128, operates valve 78, connecting line 80, to atmosphere. Line 82 being connected to source 54, piston 28 is driven to the left advancing rod 41, and platens 14 and 15, simultaneously so advancing the work through the partially opened fixed platen 12, relatively thereto, thus driving the shearing portions 22, of the platen clamp structure 16, into and through the upset metal and while they are prestressed as explained above to reduce the destructive force thereon and to prevent buckling. During this shearing action the welded pieces 20 remain secured in place by the movable clamping structures 18 and 19 and are supported by the fixed shearing clamp 12. The excess metal surrounding the weld is thus quickly and easily removed in an automatic process as a portion of the machine cycle. The position of the clamping and platen driving mechanisms at this time is as shown in FIG. 6.

After the shearing operation has been completed, the time delay relay 116 may be deenergized by depressing push button 117 to open contacts 116—1 and deenergize solenoid coil 128. The deenergization of coil 128 operates valve 78 to connect line 80 to the source 54 so that it will be biased to the right as explained above.

The movable clamping structures 18 and 19 are opened by the depression of push button 100 which deenergizes coil 98 and opens contacts 98—1 to interrupt the holding circuit and contacts 98—3 to deenergize solenoid coil 118. The deenergization of coil 118 operates valve 56 to connect line 60 to the atmosphere and line 58 to the hydraulic source 54. Pistons 53 and 55 are thus driven upward, opening the clamping structures. The fixed clamp 16 is completely opened by the depression of push button 106 which deenergizes coil 104, opening contacts 104—1 to interrupt the holding circuit and contacts 104—3 to deenergize solenoid coil 126, coils 122 and 124 already being deenergized. The deenergization of coil 126 operates valve 74 to connect line 76 to the atmosphere. The pistons 62, 64 are thus driven upward, opening the clamping structure 16. The movable platens are retracted by the depression of push button 112 which deenergizes coil 110, opening contacts 110—1 to interrupt the holding circuit, contacts 110—3 (in the primary of transformer 46) and contacts 110—5, deenergizing solenoid coil 130. The deenergization of coil 130 operates valve 84 to connect line 86 to the source 54 and line 88 to the atmosphere. Piston 26 is driven to the right driving the toggle mechanism back with rod 40 back across dead center. This allows rod 41 to move to the right, carrying its stop 47, to reset the platens 14 and 15. Stop 47 engages platen 15 to move it with platen 14. The opening of limit switch contacts 42—1 by this movement resets timer 114. The welding machine is thus reset to the position shown in FIG. 2 ready to commence another welding and shear cycle.

The fixed platen clamping mechanism 52 is a fluid motor having two pistons therein providing a removable positioning stop. In the clamping mechanism the stop is provided by piston 64 to control the permissible amount of unclamping of the workpiece secured in the platen 12 after the workpieces have been welded and before the platen 12 is advanced relative to the workpieces to remove the upset metal.

Figure 7:
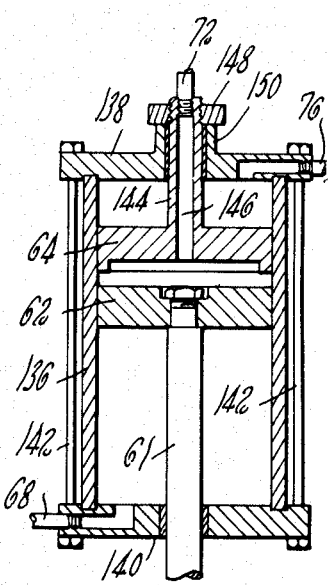
FIG. 7 is a sectional view of a type of fluid motor utilized in the preferred embodiment of the invention.

Details of the actuating motor 52 are shown in FIG. 7. The motor comprises a cylinder 136 and two cylinder heads 138, 140 which are fastened together by a plurality of studs 142, circumferentially located about the motor, passing through heads 138 and 140. There are two pistons 62, 64 within the cylinder. The actuating piston rod 61 is attached to piston 62. The piston rod 144, attached to piston 64, has a longitudinal passageway 146 which extends through the piston 64 and provides communication with the chamber between the pistons 62, 64. Threaded on piston rod 144 is a nut 148 which coacts with stop 150, mounted on cylinder head 138, to provide a positioning means. The cylinder 136 is divided into three chambers by the two pistons. Fluid pressure is admitted to the upper chamber, defined by the head 138 and piston 64 through line 76 which is connected to head 138, to the center chamber, defined by the two pistons, through line 72 which is threadedly connected to rod 144 and is in communication with passageway 146; and to the lower chamber, defined by piston 62 and head 140, through line 68 which is threadedly connected to head 140.

In operation the pistons are initially separated as shown in FIG. 7 and pressure is applied to the chambers. In the initial unclamping in cylinder 52, the central chamber is exhausted to atmospheric pressure and fluid pressure is applied to the lower chamber. Piston 62 is driven toward piston 64, its travel being terminated when it contacts that piston which acts as a positioning stop. In the complete unclamping in cylinder 52 the upper chamber is exhausted, thus removing the stop provided by piston 64. Both pistons then move up.

The principles of the invention have been described in relation to the preferred embodiment of a flash-butt welding machine. It will be understood that while there have been shown and described herein certain preferred embodiments, the invention is not intended to be limited thereby or to all details thereof, and departures may be made therefrom within the spirit and scope of the invention as set forth in the appended claims.

I claim:

1. A flash-butt welding machine including three spaced linearly relatively movable platens each having a clamp for holding a pair of workpieces to be welded together, with one of said workpieces on one side platen and the central platen and the other on the other side platen, said clamps being movable between a closed position for clamping said workpieces and an open position for removal of said workpieces, the central one of said clamps being linearly positioned between said other clamps and having an intermediate clamp opening position in which it is opened a predetermined limited distance from said workpiece, fluid motor means for advancing one of said side platens relatively to the other two of said platens and said side platens relatively to said central platen for successive welding and weld zone shearing, control means operable following the said welding to open said central clamp said predetermined limited distance while maintaining clamping pressure on the other clamps, for further simultaneous advance by said fluid motor means of said side platens with said other clamps carrying said workpiece and advancing it relatively to said central clamp while maintaining positioning support for said workpiece by said central clamp.

2. A flash-butt welding machine as claimed in claim 1 wherein said central platen is stationary and said side platens are movable relatively to said central platen and to each other.

3. A flash-butt welding machine including three spaced linearly relatively movable platens each having a clamp for holding a pair of workpieces to be welded together with one of said workpieces on one side platen and the central platen and the other on the other side platen, said clamps being movable between a closed position for clamping said workpieces and an open position for removal of said workpieces, the central one of said clamps being linearly positioned between said other clamps and having an intermediate clamp opening position in which it is opened a predetermined limited distance from said workpiece, fluid motor means for advancing one of said side platens relatively to the other two of said platens and said side platens relatively to said central platen for successive welding and weld zone shearing, said fluid motor means including removable stop means for arresting the advance of said one side platen toward the other two of said platens upon completion of welding of said workpieces, control means operable following the said welding upon said arresting of said advance to open said central clamp said predetermined limited distance while maintaining clamping pressure on the other clamps, and upon said opening of said central clamp releasing said stop means for further simultaneous advance by said fluid motor means of said side platens with said other clamps carrying said workpiece and advancing it relatively to said central clamp while maintaining positioning support for said workpiece by said central clamp.

4. A flash-butt welding machine as claimed in claim 3 wherein said fluid motor means includes a first piston and cylinder for advancing said one side platen relatively to the other two of said platens for welding and a second piston and cylinder for advancing said side platens relatively to said central platen for weld zone shearing, and said control means includes means effective to energize said second piston and cylinder for said advance for weld zone shearing.

5. A flash-butt welding machine including three linearly spaced platens comprising a fixed central platen and movable side platens, each having a clamp for holding a pair of workpieces to be welded together with one of said workpieces clamped on one side platen and the central platen and the other clamped on the other side platen, said clamps being movable between a closed position for clamping said workpieces and an open position for removal of said workpieces, the central one of said clamps being linearly positioned between said other clamps and having an intermediate clamp opening position in which it is opened a predetermined limited distance from said workpiece, fluid motor means for advancing one of said side platens carrying one of said workpieces toward the fixed central platen and the other side platen holding the other workpiece and thereafter, after said workpieces are welded together, advancing said side platens with said workpiece past said central platen for weld zone shearing, said fluid motor means including a first piston and cylinder for advancing a side platen relatively to the other two platens and a second piston and cylinder for advancing said side platens, means operable to supply welding current to said clamps and to cut off said current upon advance of one platen carrying a workpiece to a predetermined position relative to the other platens, control means operable upon completion of the advance of said one side platen toward said other platens to energize said second piston and cylinder and to open said central clamp said predetermined limited distance while maintaining clamping pressure on the other clamps, for further simultaneous advance by said fluid motor means of said side platens with said other clamps carrying said workpiece and advancing it relatively to said central clamp while maintaining positioning support for said workpiece by said central clamp.

6. A flash-butt welding machine as claimed in claim 1, further including means for prestressing in tension said welded workpieces for advance relatively to said central clamp.

References Cited in the file of this patent

UNITED STATES PATENTS

| | | |
|---|---|---|
| 1,832,719 | McBerty | Nov. 17, 1931 |
| 2,272,737 | Chapman | Feb. 10, 1942 |
| 2,875,319 | Stieglitz | Feb. 24, 1959 |
| 2,877,337 | Evans | Mar. 10, 1959 |